(12) United States Patent
Bennett (10) Patent No.: US 6,464,862 B2
(45) Date of Patent: Oct. 15, 2002

(54) GROSS POLLUTANT TRAP

(75) Inventor: Peter Joseph Bennett, Katoomba (AU)

(73) Assignee: Baramy Engineering PTY Ltd., New South Wales (AU)

(*) Notice: Subject to any disclaimer, the term of this patent is extended or adjusted under 35 U.S.C. 154(b) by 0 days.

(21) Appl. No.: 09/804,992

(22) Filed: Mar. 13, 2001

(65) Prior Publication Data

US 2001/0040124 A1 Nov. 15, 2001

(30) Foreign Application Priority Data

Mar. 13, 2000  (AU) ............................................... PQ6184

(51) Int. Cl.⁷ ............................................... B01D 33/00
(52) U.S. Cl. ................... 210/155; 210/162; 210/170; 405/74
(58) Field of Search ................... 210/154, 155, 210/162, 170, 434, 499; 405/74

(56) References Cited

U.S. PATENT DOCUMENTS

| | | | | | |
|---|---|---|---|---|---|
| 815,722 | A | * | 3/1906 | Lydon | ......................... 210/154 |
| 1,699,828 | A | * | 1/1929 | Wyckoff | ...................... 210/154 |
| 1,858,231 | A | * | 5/1932 | Parshall | ...................... 210/170 |
| 1,995,238 | A | * | 3/1935 | Bisher | ......................... 210/170 |
| 2,561,847 | A | * | 7/1951 | Danel | ......................... 210/154 |
| 2,672,982 | A | * | 3/1954 | Way | ............................ 210/155 |
| 3,815,742 | A | * | 6/1974 | Dubouchet | .................. 210/154 |
| 5,298,172 | A | * | 3/1994 | Smith | ......................... 210/154 |
| 6,042,733 | A | * | 3/2000 | Tucker | ........................ 210/170 |
| 6,086,756 | A | * | 7/2000 | Roy | ............................ 210/155 |

FOREIGN PATENT DOCUMENTS

SU        1051156      * 10/1983

* cited by examiner

Primary Examiner—Christopher Upton
(74) Attorney, Agent, or Firm—Ladas & Parry (57) ABSTRACT

A gross pollutant trap (50) to be installed in a storm water channel so as to receive storm water flowing through the channel and to filer gross pollutants from the storm water. The trap (50) includes a gross pollutant collection area (61) toward which there extends generally parallel sets (63) and (67) of vanes (64) and (68). The area (61) is at least partly defined by a mesh wall (72) through which water returns to the storm water channel.

19 Claims, 5 Drawing Sheets

GROSS POLLUTANT TRAP

TECHNICAL FIELD

The present invention relates to storm water gross pollutant traps.

BACKGROUND OF THE INVENTION

Previously known gross pollutant traps have suffered from the disadvantage they do not efficiently remove gross pollutants from a storm water stream. A further problem associated with the previously know gross pollutant traps is that the gathered pollutant material is not easily removed.

A further problem in respect of pollution is currently existing stormwater channels. Many of these stormwater channels when installed were not provided with pollutant traps.

OBJECT OF THE INVENTION

It is the object of the present invention to overcome or substantially ameliorate at least one of the above disadvantages.

SUMMARY OF THE INVENTION

There is disclosed herein a gross pollutant trap to be installed in a storm water channel, said trap including:
  a channel portion to receive storm water from the storm water channel and to return to the storm water channel storm water from which at least some gross pollutants have been removed, said channel portion including a floor from which there upwardly extends a first side channel wall on one side of the channel portion and a second side channel wall spaced from said fast side channel wall so that said floor is located therebetween;
  a collection area adjacent said first channel wall, said collection area being adapted to receive gross pollutants removed from storm water delivered to the pollutant trap;
  a first set of vanes extending upwardly from said floor at a position upstream of said collection area, said first set of vanes being arranged in a row which is generally linear and extending downstream from said second wall at an acute angle thereto towards said first wall but terminating at a distance spaced from said first wall;
  a second set of vanes extending upwardly from said floor, said second set of vanes being arranged in a row which are generally linear, said second set of vanes extending downstream at an acute angle to said second wall but being spaced therefrom and extending toward said collection area;
  a drainage wall extending from said first wall to a downstream portion of said second set so as to least partly define said collection area so that water may flow from said collection area through said drainage wall to be delivered to said stormwater channel; and wherein
  said first and second sets of vanes are spaced but overlap in the general direction of flow of water through the channel portion and direct water to said collection area.

Preferably said drainage wall is formed of metal mesh. More preferably said metal mesh is expanded metal mesh. In a further preferred form the drainage wall is provided by vertically extending bars.

Preferably said first set of vanes decrease in height from said second wall towards said first wall.

Preferably said second set of vanes decrease in height from adjacent said first wall towards said second wall.

Preferably said vanes of each set are arranged so as to extend at an acute angle to the general direction of extension of the set of vanes, with the vanes of each set being spaced but overlapping in the direction of flow of water through the channel portion.

Preferably said drainage wall includes a first portion provided by mesh or bars, and an aperture portion downstream of the first portion.

Preferably said drainage wall is generally linear.

In a further preferred form the drainage wall is provided with an elongated aperture that extends generally horizontally and is located in a lower portion of the drainage wall.

Preferably the horizontal aperture is shielded by baffles which converge upwardly above the horizontal aperture.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENTS

In FIGS. 1 to 4 of the accompanying drawings there is schematically depicted a gross pollutant trap 10. The trap 10 would be installed in a stormwater channel so as to receive stormwater flowing in a direction of the arrow 11. The stormwater would flow from an upstream end 12 to a downstream end 13 at which the water would be returned to the stormwater channel.

Figure 1:
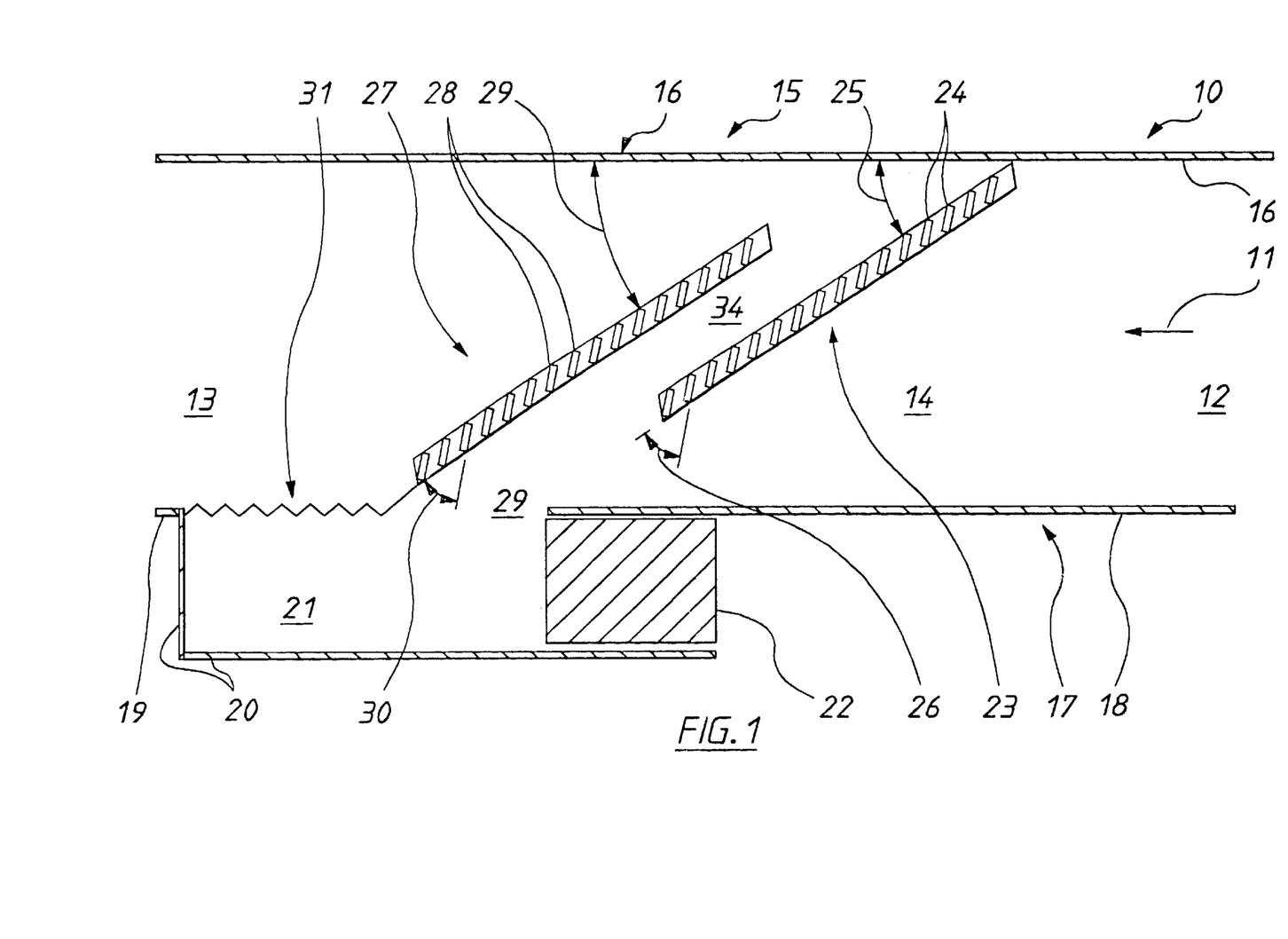
FIG. 1 is a schematic top plan view of a gross pollutant trap to be installed in a stormwater channel.

The gross pollutant trap 10 includes a storm water channel portion 15 consisting of a floor 14 from which there upwardly extends a first channel wall 16 and a second channel wall 17. The channel walls 16 and 17 would preferably diverge from the floor 14.

The side wall 17 includes an upstream wall portion 18 and a downstream wall portion 19. The side wall 17, further includes wall portions 20 which partly define a pollutant collection area 21. An access ramp 22 extends downwardly to the area 21. Typically the access ramp 22 would provide for access to the area 21 by personnel to clean the area 21. Typically the access ramp 22 would provide vehicle access to the area 21.

Figure 2:
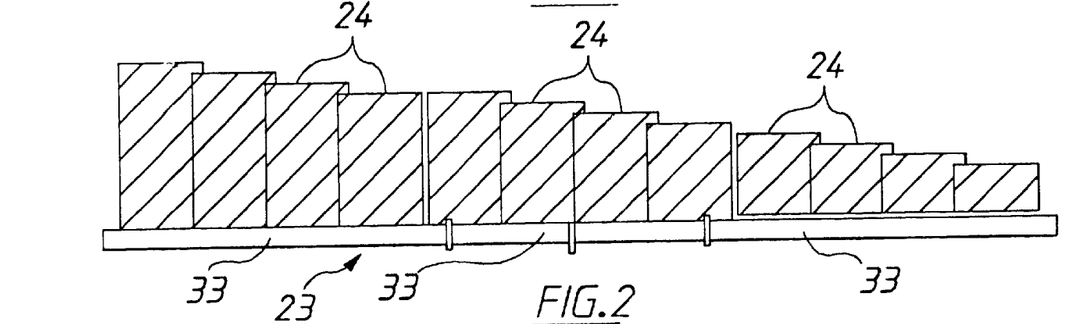
FIG. 2 is a schematic side elevation of a row of vanes employed in the trap of FIG. 1.
Figure 3:
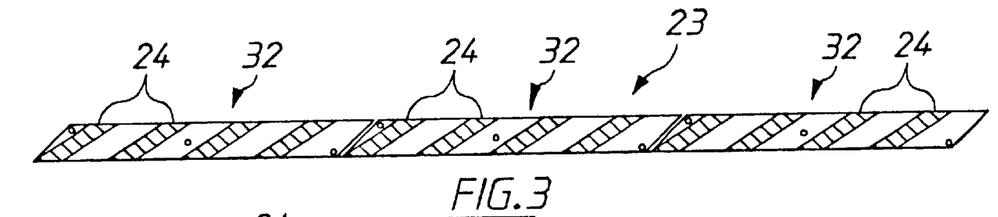
FIG. 3 is a schematic top plan view of the set of FIG. 2.

A first set 23 of vanes 24 is attached to and extends upwardly from the floor 14. The set 23 is arranged in a linear manner so that the set 23 extends at an acute angle 25 to the side wall 16. The set 23 decreases in height from the side wall 16 towards the side wall 17. The set 23 terminates short of the side wall 17. Each of the vanes 24 is arranged at an acute angle 26 to the longitudinal direction of extension of the set 23.

Also fixed to the floor 14 is a second set 27 of vanes 28. The set 27 is arranged in a linear manner so as to extend at an acute angle 29 to the side wall 16. The vanes 28 decrease in height from adjacent the side wall 17 toward the side wall 16 The set 27 terminates short of the side wall 16 Each of the vanes 28 is arranged at an acute angle 34 to the longitudinal direction of extension of the set 27.

The sets 23 and 27 extend about ¾<sup>th</sup> the width of the portion 15.

Extending from the lower end of the set 27 is a drainage wall in the form of a mesh wall 31. The mesh wall 31, is preferably formed of expanded metal mesh and has a "zig-zag" configuration as illustrated. The mesh 31 extends from the lower end of the set 27 to the downstream portion 19 of the side wall 17, and is spaced by a gap 29 from the wall portion 18.

Although the set 27 is spaced from the set 23, the sets 27 and 23 overlain the direction of the flow 11. Similarly, each of the vanes 27 of the set 23 are spaced but again overlap in the direction 11. The same can be said for the set 27.

Preferably the vanes 24 have a maximum height of approximately two-thirds the height of the wall 16 while at a position adjacent the middle of the channel 15, the vanes 24 have a height approximately one-third of the height of the wall 16.

Preferably the vanes 28 have a maximum height of two-thirds the height of the wall 17, with the vanes adjacent the middle of the channel 14 being approximately a third of the height of the wall 17.

Figure 4:
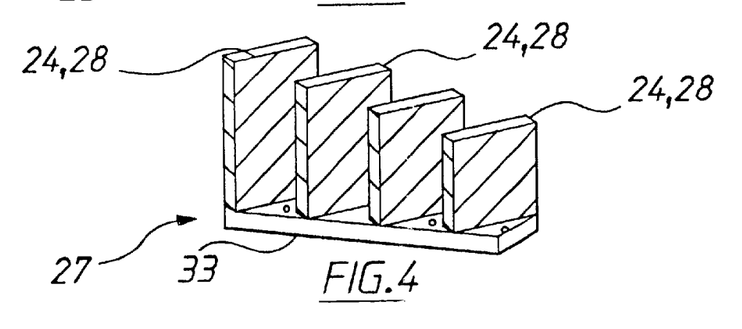
FIG. 4 is a schematic perspective view of a vane assembly employed in the row of FIGS. 2 and 3.

Preferably the vanes 24 as well as the vanes 28 are arranged in modules 32. Each module including a plurality of the vanes 24, 28 secured to and extending up from a base 33. Each of the bases 33 would then be secured to the floor 14.

The number of vanes 24 and 28 can be varied both in size and angles 26 and 29 to suit particular flow conditions that may exist in the channel within which the trap 10 is to be installed. The angles 25 and 29 may also be varied to suit the conditions of the particular site. However, the angles 25 and 29 would typically be about 15° to 25°. A further variation is the overlap of the two sets 23 and 24 in the direction of the arrow 11. Typically the overlap would be approximately one-third the length of each set 23 and 27.

In operation of the above-described gross pollutant trap 10, is to cause gross pollutants directed to the collection area 21. Flow being diverted by the vanes 24 and 28 will encounter previously stacked pollutant material. However, storm water will be able to continue toward the downstream end 13 by flowing between the vanes 24 and 28 as well as through the mesh 31. Additionally water can flow from the upstream end 12 to the downstream end 13 by flowing between the two sets 23 and 27, that is via the gap 34. This would occur to relieve back pressure of water building-up, upstream of the area 21.

Figure 5:
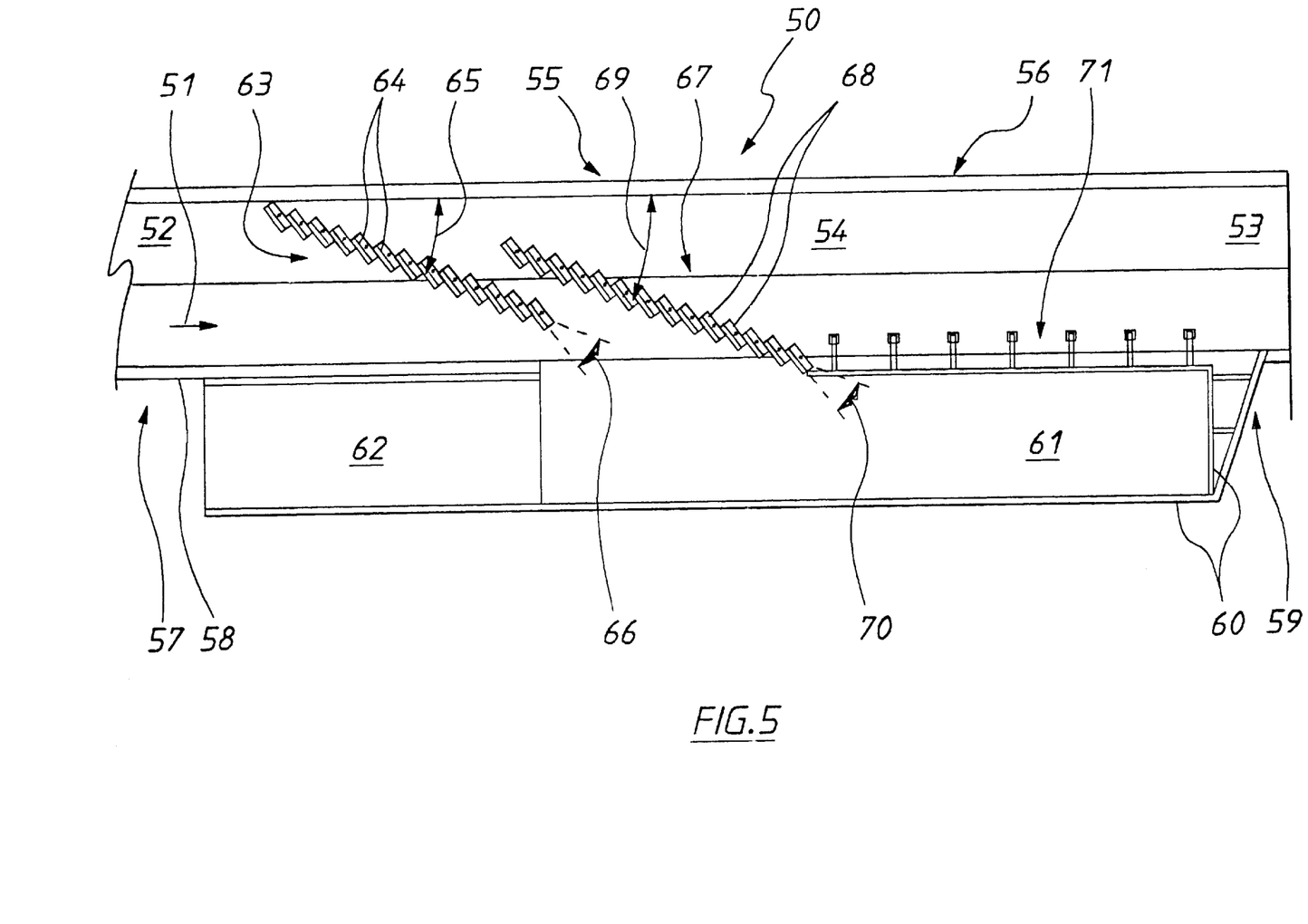
FIG. 5 is a schematic top plan view of a modification of the gross pollutant trap of FIG. 1.
Figure 6:
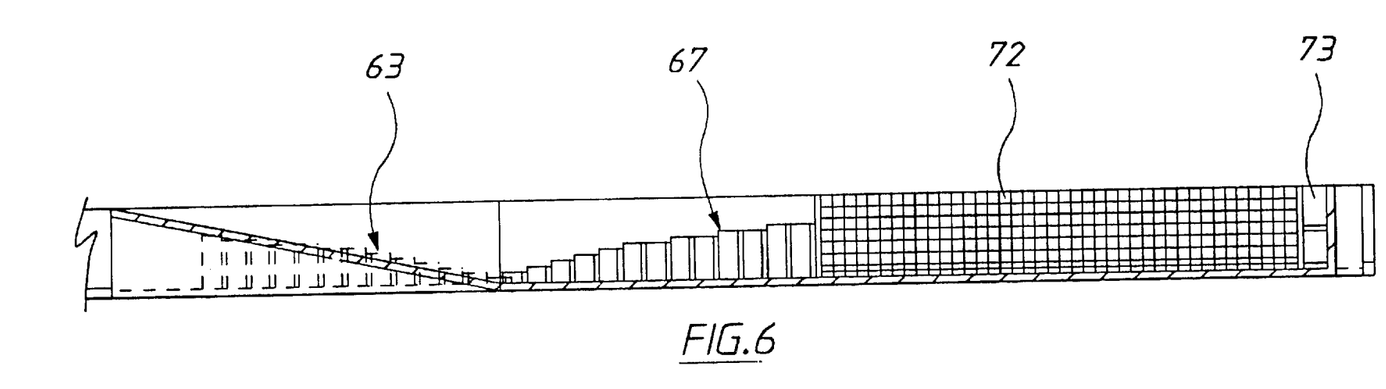
FIG. 6 is a schematic part sectioned side elevation of the gross pollutant trap of FIG. 5.
Figure 7:
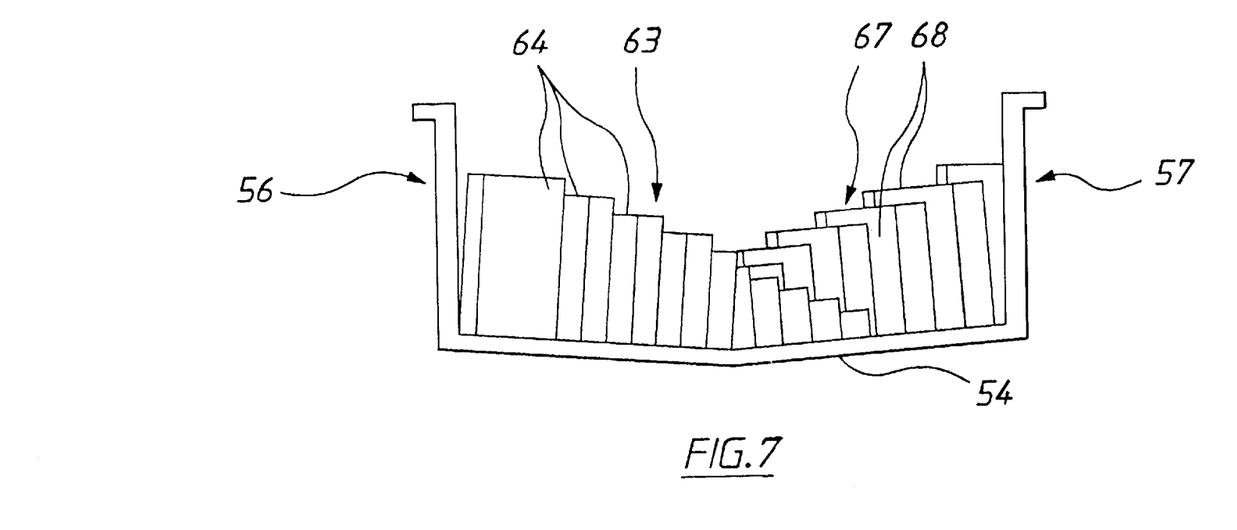
FIG. 7 is a schematic end elevation of the gross pollutant trap of FIG. 5.

In FIGS. 5 to 7 of the accompanying drawings there is schematically depicted a gross pollutant trap 50. The trap would be installed in a storm water channel so as to receive storm water flowing in the direction of the arrow 51. The storm water would flow from an upstream end 52 to a downstream end 53 at which the stormwater would be returned to the storm water channel.

The gross pollutant trap 50 includes a storm water channel portion 55 consisting of a floor 54 from which there upwardly extends a first channel wall 56 and a second channel wall 57. The channel walls 56 and 57 are generally parallel and are spaced by the floor 54. The side wall 57, includes an upstream wall portion 58 and a downstream wall portion 59. The side wall 57 further includes a wall portion 60 which partly defines a pollutant collection area 61. An access ramp 62 extends downwardly to the area 61. Typically the access ramp 62 would provide access to the area 61 by personnel to clean the area 61. Typically the access ramp 62 would provide vehicle access to the area 61.

A first set 63 of vanes 64 is attached to and extends upwardly from the floor 54. The set 63 is arranged in a linear manner so that the set 63 extends at an acute angle 65 to the side wall 56. The set 63 decreases in height from the side wall 56 towards the side wall 57. The set 63 terminates short of the side wall 57. Each of the vanes 64 is arranged at an acute angle 66 to the longitudinal direction of extension of the set 63.

Also fixed to the floor 54 is a second set 67 of vanes 68. The set 67 is arranged in a linear manner so as to extend at an acute angle 64 to the side wall 56. The vanes 68 decrease in height from adjacent the side wall 57, toward the side wall 56. The set 67 terminates short of the side wall 56. Each of the vanes 68 is arranged at an acute angle 70 to the longitudinal direction extension of the set 67.

Extending from the downstream end of the set 67 is a drainage wall 71. The wall 71 includes a filter portion 72 and an aperture portion 73. The portion 72 may be formed of expanded metal mesh or vertically extending bars.

Figure 8:
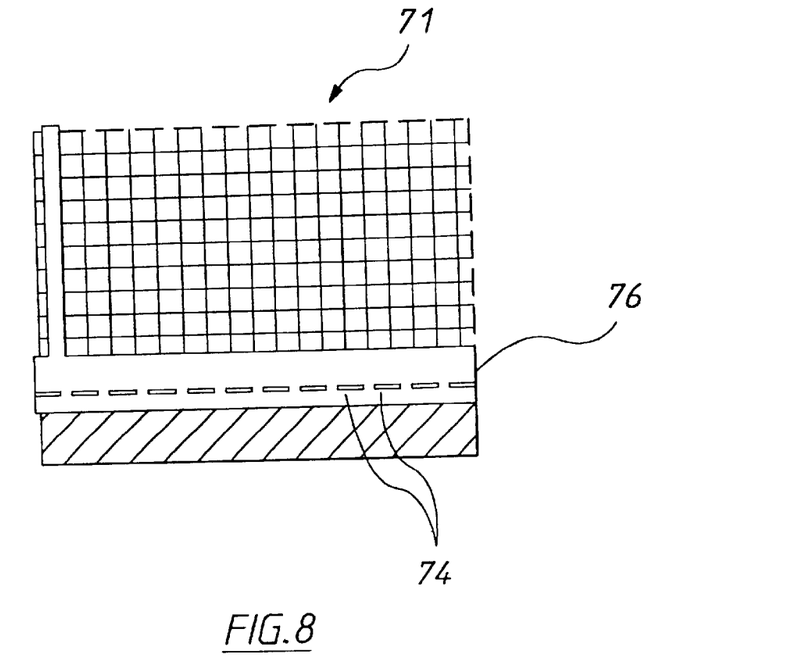
FIG. 8 is a schematic elevation of a modification of a portion of the gross pollutant trap of FIG. 5.
Figure 9:
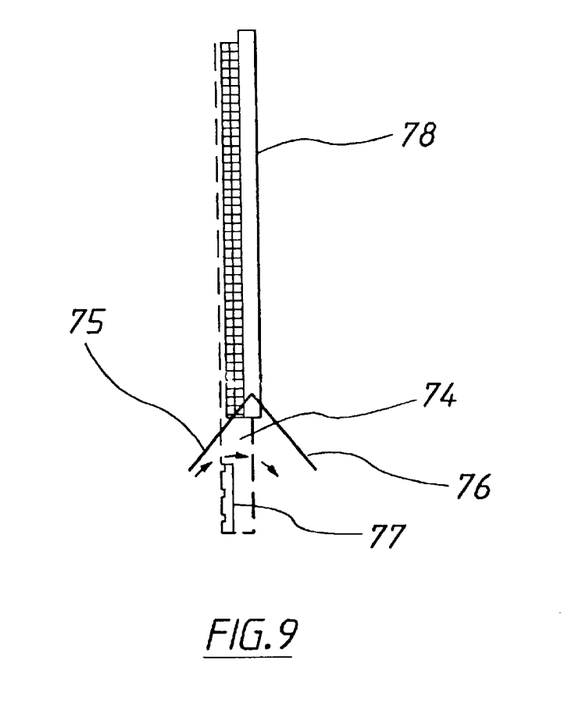
FIG. 9 is a schematic end elevation of the modification of FIG. 8.

In a modification of the gross pollutant trap 50, the portions 72 and 73 may both be formed of mesh, and each provided with a longitudinally extending aperture of series of apertures 74 shielded by baffles 75 and 76 which converge towards the upper end of the aperture/s 74. The aperture/s 74 are positioned above a mounting plate 77 supporting the sections 72 and 73.

Extending from the junction of the baffles 75 and 76 is one or more tubes 78 which bleed air to blow the baffles 75 and 76 to inhibit syphoning.

Water within the area 61 is allowed to exit via the expanded metal mesh as well as the aperture/s 74.

The vanes 64 and 68 may be secured to the floor 54 or cast intrically therewith.

The angles 66 and 67 are preferably 15° to 25°, preferably about 20°.

What is claimed is:

1. A gross pollutant trap to be installed in a storm water channel, said trap including:

a channel pardon to receive storm water from the storm channel and to return to the storm water channel storm water from which at least some gross pollutants have been removed, said channel portion including a floor from which there upwardly extends a first side channel wall on one side of the channel portion and a second side channel wall spaced from said first side channel wall so that said floor is located therebetween, said first side channel wall including a downstream portion;

a collection area adjacent said first channel wall, said collection area being adapted to receive gross pollutants removed from storm water delivered to the pollutant trap;

a first set of vanes extending upwardly from said floor at a position upstream of said collection area, said first set of vanes being arranged in a row which is generally linear and extending downstream from said second wall at an acute angle thereto towards said first wall but terminating at a distance spaced from said first wall;

a second set of vanes extending upwardly from said floor, said second set of vanes being arranged in a row which are generally linear, said second set of vanes extending downstream at an acute angle to said second wall but being spaced therefrom and extending toward said collection area;

a drainage wall of expanded metal mesh extending upstream from said first wall downstream portion to a downstream portion of said second set so as to least partly define said collection area so that water may flow from said collection area through said drainage wall to be delivered to said storm water channel; and wherein said first and second sets of vanes are spaced but overlap relative to the general direction of flow of water through the channel portion and direct water to said collection area.

2. The trap of claim 1 wherein said first set of vanes decrease in height from said second wall towards said first wall.

3. The trap of claim 2 wherein said second set of vanes decrease in height from adjacent said first wall towards said second wall.

4. The trap of claim 1 wherein said vanes said vanes of each set are arranged so as to extend at an acute angle to the general direction of extension of the set of vanes, with the vanes of each set being spaced but overlapping in the direction of flow of water through the channel portion.

5. The trap of claim 1 wherein said drainage wall includes a first portion provided by said mesh or bars, and an aperture portion downstream of the first portion.

6. The trap of claim 5 wherein said drainage wall is generally linear.

7. The trap of claim 6 wherein the drainage wall is provided with an elongated aperture that extends generally horizontally and is located in a lower portion of the drainage wall.

8. The trap of claim 7 wherein the horizontal aperture is shielded by baffles which converge upwardly above the horizontal aperture.

9. A gross pollutant trap to be installed in a storm water channel, said trap including:

a channel portion to receive storm watery from the storm water channel and to return to the storm water channel storm water from which at least some gross pollutants have bean removed, said channel portion including a floor from which there upwardly extends a first side channel wall on one side of the channel portion and a second side channel wall spaced from said first side channel wall so that said floor is located therebetween, said first side channel wall including a downstream portion;

a collection area adjacent said first channel wall, said collection area being adapted to receive gross pollutants removed from storm water delivered to the pollutant trap;

a first set of vanes extending upwardly from said floor at a position upstream of said collection area, said first set of vanes being arranged in a row which is generally linear and extending downstream from said second wall at an acute angle thereto towards said first wall but terminating at a distance spaced from said first wall;

a second set of vanes extending upwardly from said floor, said second set of vanes being arranged in a row which are generally linear, said second set of vases extending downstream at an acute angle to said second wall but being spaced therefrom and extending toward said collection area;

a drainage wall of vertically extending bars, and which extends upstream from said first wall downstream portion to a downstream portion of said second set so as to least partly define said collection area so that water may flow from said collection area through said drainage wall to be delivered to said storm water channel; and wherein said first and second sets of vanes are spaced but overlap relative to the general direction of floor of wares through the channel portion and direct water to said collection area.

10. The trap of claim 9 wherein said first set of vanes decrease in height from adjacent said second wall towards said first wall.

11. The trap of claim 10 wherein said second set of vanes decrease in height from adjacent said first wall towards said second wall.

12. The trap of claim 9 wherein said vanes said vanes of each set are arranged so as to extend at an acute angle to the general direction of extension of the set of vanes, with the vanes of each set being spaced but overlapping in the direction of flow of water through the channel portion.

13. The trap of claim 9 wherein said drainage wall includes a first portion provided by said bars, and an aperture portion downstream of the first portion.

14. The trap of claim 13 wherein said drainage wall is generally linear.

15. The trap of claim 14 wherein the drainage wall is provided with an elongated aperture that extends generally horizontally and is located in a lower portion of the drainage wall.

16. The trap of claim 15 wherein the horizontal aperture is shielded by baffles which converge upwardly above the horizontal aperture.

17. A gross pollutant trap to be installed in a storm water channel, said trap including:

a channel portion to receive storm water from the storm water channel and to return to the storm water channel storm water from which at least some gross pollutants have been removed, said channel portion including a floor from which there upwardly extends a first side channel wall on one side of the channel portion and a second side channel wall spaced from said first side channel wall so that said floor is located therebetween, said first side channel wall including a downstream portion;

a collection area adjacent said first channel wall, said collection area being adapted to receive gross pollutants removed from storm water delivered to the pollutant trap;

a first set of vanes extending upwardly from said floor at a position upstream of said collection area, said fast set of vanes being arranged in a row which is generally linear and extending downstream from said second wall at an acute angle thereto towards said first wall but terminating at a distance spaced from said first wall with the vanes decreasing in height from said second wall toward said fast wall;

a second set of vanes extending upwardly from said floor, said second set of vanes being arranged in a row which are generally linear, said second salt of vanes extending downstream at an acute eagle to said second wall but being spaced therefrom and extending toward said collection area;

a drainage wall extending upstream from said first wall downstream portion to a downstream portion of said second set so as to least partly define said collection area so that water may flow from said collection area through said drainage wall to be delivered to said stormwater channel; and wherein the vanes in said first set and the vanes in said second set are spaced so that the vanes in said first set overlap relative to the general direction of flow of water through the channel portions and the vanes in said second set overlap relative to the general direction of flow of water through the channel direct water to said collection area.

18. The trap of claim 17 wherein said second set of vanes decrease is height from adjacent said first wall towards said second wall.

19. The trap of claim 18, wherein said vanes said vanes of each set are arranged so as to extend at an acute eagle to the general direction of extension of the set of vanes, with the vanes of each set being spaced but overlapping in the direction of flow of water through the channel portion.

* * * * *

UNITED STATES PATENT AND TRADEMARK OFFICE
CERTIFICATE OF CORRECTION

PATENT NO. : 6,464,862 B2  Page 1 of 1
DATED : October 15, 2002
INVENTOR(S) : Peter Joseph Bennett It is certified that error appears in the above-identified patent and that said Letters Patent is hereby corrected as shown below:

Column 4,
Line 50, "pardon" should read -- portion --.

Column 5,
Line 11, delete "least",
Line 25, "said vanes said vanes" should read -- said vanes -- , and
Line 47, "bean" should read -- been --.

Column 6,
Line 11, "floor of wares" should read -- flow of water --,
Line 21, "said vanes said vanes" should read -- said vanes --,
Line 55, "fast" should read -- first --,
Line 61, "fast" should read -- first --,
Line 64, "salt" should read -- set --, and
Line 65, "eagle" should read -- angle --.

Column 7,
Line 3, delete "least".

Column 8,
Line 6, "said vanes said vanes" should read -- said vanes --, and
Line 7, "eagle" should read -- angle --.

Signed and Sealed this

Nineteenth Day of October, 2004

JON W. DUDAS
*Director of the United States Patent and Trademark Office*